US012736067B2

(12) United States Patent
Cheng et al.

(10) Patent No.: US 12,736,067 B2
(45) Date of Patent: Sep. 15, 2026

(54) HYBRID ELECTRO-HYDRAULIC LOAD SENSING SYSTEM AND CONTROL METHOD THEREOF

(71) Applicant: Chongqing University, Chongqing City (CN)

(72) Inventors: Min Cheng, Chongqing City (CN); Xiongfeng Tang, Chongqing City (CN); Hongyun Mu, Chongqing City (CN)

(73) Assignee: CHONGQING UNIVERSITY, Chongqing City (CN)

( * ) Notice: Subject to any disclaimer, the term of this patent is extended or adjusted under 35 U.S.C. 154(b) by 0 days.

(21) Appl. No.: 19/079,350

(22) Filed: Mar. 13, 2025

(65) Prior Publication Data

US 2025/0347299 A1 Nov. 13, 2025

(30) Foreign Application Priority Data

May 13, 2024 (CN) ......................... 202410587187.3

(51) Int. Cl.
*F15B 11/16* (2006.01)
*F15B 21/14* (2006.01)
(Continued)

(52) U.S. Cl.
CPC ............ *F15B 11/165* (2013.01); *F15B 21/14* (2013.01); *E02F 9/2075* (2013.01); *E02F 9/2091* (2013.01); *E02F 9/2225* (2013.01); *E02F 9/2228* (2013.01); *E02F 9/2232* (2013.01); *E02F 9/2246* (2013.01); *E02F 9/2285* (2013.01); *E02F 9/2296* (2013.01);
(Continued)

(58) Field of Classification Search
CPC .......... F15B 11/161; F15B 2211/20515; F15B 2211/20546; F15B 2211/20553; F15B 2211/30535; F15B 2211/30565; F15B 2211/605; F15B 2211/6651; F15B 2211/6658; F15B 2211/71; E02F 9/2075; E02F 9/2091; E02F 9/2225; E02F 9/2228;
(Continued)

(56) References Cited

U.S. PATENT DOCUMENTS 7,397,209 B2 * 7/2008 Hirai ..................... F15B 15/088 310/112
8,362,629 B2 * 1/2013 Weber ..................... F04B 17/03 37/348
(Continued)

*Primary Examiner* — Dustin T Nguyen
(74) *Attorney, Agent, or Firm* — Tutunjian & Bitetto, P.C.

(57) ABSTRACT

A hybrid electro-hydraulic load sensing system and a control method are provided. A hybrid actuator of the hybrid electro-hydraulic load sensing system includes a second hydraulic actuator and a load balancing actuator. A battery is connected to a power source through a first inverter and the load balancing actuator through a second inverter. The power source is connected to a load sensing pump, the load sensing pump is connected to a first hydraulic actuator through a first control valve and connected to a second hydraulic actuator through a second control valve, and a first pressure sensor and a second pressure sensor are disposed at an inlet and an outlet of the second hydraulic actuator respectively. A control device is connected to the first pressure sensor, the second pressure sensor, a third pressure sensor, a motor of the load balancing actuator and one oil control assembly.

13 Claims, 10 Drawing Sheets

(51) Int. Cl.
*E02F 9/20* (2006.01)
*E02F 9/22* (2006.01)

(52) U.S. Cl.
CPC ............... *F15B 2211/20515* (2013.01); *F15B 2211/20546* (2013.01); *F15B 2211/20553* (2013.01); *F15B 2211/30535* (2013.01); *F15B 2211/30565* (2013.01); *F15B 2211/605* (2013.01); *F15B 2211/6651* (2013.01); *F15B 2211/6658* (2013.01); *F15B 2211/71* (2013.01); *F15B 2211/7107* (2013.01); *F15B 2211/88* (2013.01)

(58) Field of Classification Search
CPC ..... E02F 9/2232; E02F 9/2246; E02F 9/2285; E02F 9/2296

See application file for complete search history.

(56) References Cited

U.S. PATENT DOCUMENTS

| | | | | |
|---|---|---|---|---|
| 8,812,202 | B2 * | 8/2014 | Yamamoto | E02F 9/2217<br>701/84 |
| 8,950,180 | B2 * | 2/2015 | Ooki | E02F 9/123<br>60/420 |
| 9,109,586 | B2 * | 8/2015 | Yamada | E02F 9/2095 |
| 9,518,593 | B2 * | 12/2016 | Mori | E02F 9/2217 |
| 9,574,324 | B2 * | 2/2017 | Satake | E02F 9/267 |
| 9,581,176 | B2 * | 2/2017 | Izumi | F15B 15/18 |
| 9,732,770 | B2 * | 8/2017 | Yudate | E02F 9/2285 |
| 9,951,497 | B2 * | 4/2018 | Ge | E02F 9/2075 |
| 10,150,465 | B2 * | 12/2018 | Hita | B60W 20/13 |
| 10,280,592 | B2 * | 5/2019 | Takahashi | E02F 9/2235 |
| 10,697,150 | B2 * | 6/2020 | Takahashi | E02F 9/22 |
| 11,092,175 | B1 * | 8/2021 | Blanding | B64C 13/42 |
| 11,976,676 | B2 * | 5/2024 | Quan | E02F 9/2095 |
| 12,540,633 | B2 * | 2/2026 | Denis | B25J 9/0006 |
| 2008/0317574 | A1 * | 12/2008 | Moriya | E02F 9/2217<br>212/232 |
| 2016/0312440 | A1 * | 10/2016 | Izumi | F15B 15/088 |
| 2017/0356163 | A1 * | 12/2017 | Hita | E02F 9/20 |

* cited by examiner

HYBRID ELECTRO-HYDRAULIC LOAD SENSING SYSTEM AND CONTROL METHOD THEREOF

FIELD OF THE INVENTION

The present invention belongs to the technical field of hydraulic transmission and control, and particularly relates to a hybrid electro-hydraulic load sensing system and a control method thereof.

BACKGROUND OF THE INVENTION

In the current international community where energy conservation and emission reduction are emphasized, the large energy loss and low efficiency of hydraulic transmission systems are key issues restricting their development. With the adoption the principle of pressure feedback, a load sensing control technology adjusts a variable pump in real time according to a load pressure of an actuator to achieve the balance between the supply and demand of a system flow, which can effectively improve the efficiency of the hydraulic transmission system and reduce energy consumption. However, the following problem still exists when the load sensing control technology is applied: when the load sensing pump supplies oil to multiple actuators, it is necessary to control an output pressure of the pump based on a maximum load pressure of each actuator. Due to a load difference between the actuators, each actuator branch needs a pressure compensator to match its load pressure, which inevitably leads to a large throttling loss on the pressure compensator. Additionally, the system's operation generates recoverable potential energy, but traditional load sensing system exhibits low recovery efficiency for such energy. Therefore, how to eliminate the load difference when multiple actuators coordinated actuation, recover the potential energy, and improve the energy utilization efficiency of the system is a problem that needs to be solved in the present invention.

SUMMARY OF THE INVENTION

The present invention provides a hybrid electro-hydraulic load sensing system and a control method thereof, so as to solve the problem of an energy loss caused by load imbalance among actuators in a current load sensing control system.

According to a first aspect of the embodiment of the present invention, there is provided a hybrid electro-hydraulic load sensing system, including a battery, a first inverter, a second inverter, a power source, a load sensing pump, a hybrid actuator and a first hydraulic actuator, where the hybrid actuator includes a second hydraulic actuator and a load balancing actuator which are connected in parallel, the battery is connected to the power source through the first inverter and connected to the load balancing actuator through the second inverter, the power source is connected to the load sensing pump, the load sensing pump is connected to the first hydraulic actuator through a first control valve and connected to the second hydraulic actuator through a second control valve, and a first pressure sensor and a second pressure sensor are disposed at an inlet and an outlet of the second hydraulic actuator respectively; and a control device is respectively connected to the first pressure sensor, the second pressure sensor, a third pressure sensor, a motor of the load balancing actuator and one oil control assembly in the power source and the load sensing pump; the control device firstly initiates operation by analyzing pressure data from the first and second pressure sensors alongside incoming action signals to determine the hybrid actuator's operational mode. Using this mode selection and sensor inputs, it calculates the second hydraulic actuator's load pressure ($p_1$). Simultaneously, the system monitors the first hydraulic actuator's maximum load pressure ($p_2$) through the third pressure sensor. Based on these pressure values ($p_1$ and $p_2$) and the received action commands, the device coordinates two parallel control actions: it regulates the oil control assembly to adjust the load sensing pump's output flow, while controlling the motor to manage both magnitude and direction of the force/torque in the load balancing actuator. So that the load balancing actuator recovers a throttling loss, caused by a load difference between the actuators, and potential energy, generated in a process that the hybrid actuator drives the load to move, into the battery.

In an alternative implementation, when only one first hydraulic actuator exists, the third pressure sensor is disposed at a load feedback port of the first control valve, and the maximum load pressure $p_2$ is a load pressure of the first hydraulic actuator; and when a plurality of first hydraulic actuators exist, for every two sequentially adjacent first hydraulic actuators, a first shuttle valve is disposed between the two adjacent first hydraulic actuators, a first inlet of the first shuttle valve is connected to a load feedback port of the first control valve corresponding to one of the first hydraulic actuators, a second inlet of the first shuttle valve is connected to an outlet of a next first shuttle valve, an outlet of the first shuttle valve is connected to a second inlet of a previous first shuttle valve, where only the outlet of the first shuttle valve ranking the first is connected to the third pressure sensor, and only a second inlet of a last first shuttle valve is connected to a load feedback port of the first control valve corresponding to another first hydraulic actuator, and the maximum load pressure $p_2$ is a maximum load pressure of the plurality of first hydraulic actuators.

In another alternative implementation, when only one first hydraulic actuator exists, a second pressure compensator is also disposed between the second control valve and the load sensing pump, a load feedback port of the second control valve is connected to a pilot port of the second pressure compensator, a first pressure compensator is also disposed between the first control valve and the load sensing pump, and the load feedback port of the first control valve is connected to a pilot port of the first pressure compensator;

the hybrid electro-hydraulic load sensing system further includes a second shuttle valve, wherein a first inlet of the second shuttle valve is connected to the load feedback port of the second control valve, a second inlet of the second shuttle valve is connected to the load feedback port of the first control valve, an outlet of the second shuttle valve is connected to the load sensing pump or a fourth pressure sensor, and the outlet of the second shuttle valve screens out the maximum load pressure of the hybrid actuator and the first hydraulic actuator; when the load difference exceeds a maximum balancing power of the load balancing actuator, resulting in an abnormal operating state of the system, the control device adjusts a rotational speed of the power source according to a pressure detected by the fourth pressure sensor, or the load sensing pump adjusts its displacement by itself, to, cause the power source to drive the load sensing pump to supply a corresponding amount of oil, so that a system pressure outputted by the load sensing pump matches the maximum load pressure of the hybrid actuator and the first hydraulic actuator, and the first pressure compensator or the second pressure compensator is used to adjust the pressure supplied to the first hydraulic actuator or the second hydraulic actuator;

when a plurality of first hydraulic actuators exist, a second pressure compensator is also disposed between the second control valve and the load sensing pump, and the load feedback port of the second control valve is connected to a pilot port of the second pressure compensator; for each first hydraulic actuator, a corresponding first pressure compensator is also disposed between the first control valve corresponding to the first hydraulic actuator and the load sensing pump, and the load feedback port of each first control valve is connected to the pilot port of the corresponding first pressure compensator;

the hybrid electro-hydraulic load sensing system further includes a second shuttle valve, wherein a first inlet of the second shuttle valve is connected to the load feedback port of the second control valve, and a second inlet of the second shuttle valve is connected to the outlet of the first shuttle valve ranking the first; an outlet of the second shuttle valve is connected to the load sensing pump or the fourth pressure sensor, and the outlet of the second shuttle valve screens out the maximum load pressure of the hybrid actuator and the plurality of first hydraulic actuators; when the load difference exceeds a maximum balancing power of the load balancing actuator, resulting in an abnormal operating state of the system, the control device adjusts a rotational speed of the power source according to a pressure detected by the fourth pressure sensor, or the load sensing pump adjusts its displacement by itself, to cause the power source to drive the load sensing pump to supply a corresponding amount of oil, so that a system pressure outputted by the load sensing pump matches the maximum load pressure of the hybrid actuator and the plurality of first hydraulic actuators, and each first pressure compensator or second pressure compensator is used to adjust the pressure supplied to the corresponding first hydraulic actuator or second hydraulic actuator.

In another alternative implementation, the hybrid actuator is a hybrid cylinder composed of a hydraulic cylinder and an electro-mechanical actuator which are connected in parallel, or a hybrid cylinder composed of a hydraulic cylinder and an electro-hydrostatic actuator which are connected in parallel, or a hybrid motor composed of a hydraulic motor and an electric motor which are connected in parallel; and the load balancing actuator is an electro-mechanical actuator, an electro-hydrostatic actuator or an electric motor.

In another alternative implementation, the power source is an electric machine or an engine; and the first hydraulic actuator is a hydraulic cylinder or a hydraulic motor.

In another alternative implementation, an outlet of the load sensing pump is connected to a first inlet of the corresponding first control valve, an outlet of the first control valve is connected to an inlet of the first hydraulic actuator, and an outlet of the first hydraulic actuator is connected to a second inlet of the first control valve; and the outlet of the load sensing pump is also connected to an inlet of the corresponding second control valve, an outlet of the second control valve is connected to the inlet of the corresponding second hydraulic actuator, and the outlet of the second hydraulic actuator is connected to a second inlet of the second control valve.

According to a second aspect of the embodiment of the present invention, there is also provided a control method of the hybrid electro-hydraulic load sensing system, where the control device performs system control according to the following steps:

step S100: after receiving an action signal, judging whether the system will be in a state of an independent action of the hybrid actuator or a state of a combined action of the hybrid actuator and the first hydraulic actuator according to the action signal, and sending the action signal to the control valves corresponding to the hybrid actuator and the first hydraulic actuator, so as to switch the control valves, thereby switching the system to the corresponding action state;

step S200: calculating a force or torque of the second hydraulic actuator based on pressures in two chambers of the second hydraulic actuator in the hybrid actuator detected by the first and the second pressure sensor, determining a direction of the force or torque of a current load on the hybrid actuator according to the calculated force or torque of the second hydraulic actuator and the force or torque currently outputted by the load balancing actuator in the hybrid actuator, determining, according to the action signal, a movement direction that the hybrid actuator is about to enter after the system is switched to the corresponding action state, and judging whether the hybrid actuator is in an resistive mode or an overrunning mode according to the direction of the force or torque of the current load and the movement direction; and step S300: dividing system working conditions based on the action state and the mode. Based on the system working conditions and these pressure values ($p_1$ and $p_2$), regulating the oil control assembly to adjust the load sensing pump's output flow, while controlling the motor to manage both magnitude and direction of the force/torque in the load balancing actuator. So that the load balancing actuator recovers a throttling loss, caused by a load difference between the actuators, and potential energy, generated in a process that the hybrid actuator drives the load to move, into the battery.

In an alternative implementation, judging whether the hybrid actuator is in an resistive mode or an overrunning mode according to the direction of the force or torque of the load and the movement direction in the step S200 includes: when the direction of the force or torque of the load is opposite to the movement direction, the hybrid actuator being in the resistive mode; and when the direction of the force or torque of the load is the same as the movement direction, the hybrid actuator being in the overrunning mode;

before the step S300, the control method further includes: obtaining the load pressure $p_1$ of the second hydraulic actuator according to the pressures detected by the first pressure sensor and the second pressure sensor and the determined mode, the load pressure $p_1$ is the inlet pressure of the hybrid actuator; when the hybrid actuator is a hybrid cylinder, if the hybrid cylinder is extending, then the load pressure $p_1$ being a pressure detected by the corresponding pressure sensor connected to a rodless chamber in the second hydraulic actuator; and if the hybrid cylinder is retracting, the load pressure $p_1$ being a pressure detected by the corresponding pressure sensor connected to a rod chamber in the second hydraulic actuator.

In another alternative implementation, the step S300 specifically includes:

when the system working condition is that the hybrid actuator acts alone in the resistive mode, the motor of the load balancing actuator being unable to operate in a generator mode, controlling the motor of the load balancing actuator not to act, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, and at this time the second hydraulic actuator bearing all the loads and driving the load balancing actuator to move along;

when the system working condition is that the hybrid actuator acts alone in the overrunning mode, controlling the motor to drive the load balancing actuator to output a force or torque of a corresponding magnitude in a direction opposite to the direction of the load to cause the load balancing actuator to bear all the loads and operates in the generator mode, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, thereby enabling the second hydraulic actuator to follow the movement of the load balancing actuator;

When the system working condition is that the hybrid actuator acts in combination with the first hydraulic actuator in the resistive mode, comparing the load pressure $p_1$ with the maximum load pressure $p_2$ of the first hydraulic actuator detected by the third pressure sensor:

if $p_1>p_2$, then on the premise that the second pressure compensator corresponding to the hybrid actuator does not act, controlling the motor to drive the load balancing actuator to output a force or torque of corresponding magnitude in a direction the same as the movement direction of the second hydraulic actuator and opposite to the direction of the load, letting a difference between $p_1$ and $p_2$ be a first pressure, and the force or torque outputted by the load balancing actuator is equal to the force or torque outputted by the second hydraulic actuator when the load applies the first pressure to the second hydraulic actuator, adjusting, by the control device, the rotational speed of the power source, or adjusting the displacement of the load sensing pump by itself, to cause the power source to drive the load sensing pump to output a corresponding amount of oil, so that a system pressure outputted by the load sensing pump matches the maximum load pressure $p_2$, and at this time the load balancing actuator operates in an energy consumption mode; and if $p_1<p_2$, then on the premise that the second pressure compensator corresponding to the hybrid actuator does not act, controlling the motor to drive the load balancing actuator to output a force or torque of corresponding magnitude in a direction opposite to the movement direction of the second hydraulic actuator and the same as the direction of the load, letting a difference between $p_1$ and $p_2$ be a second pressure, the force or torque outputted by the load balancing actuator is equal to the force or torque outputted by the second hydraulic actuator when the load applies the second pressure to the second hydraulic actuator, adjusting, by the control device, the rotational speed of the power source, or adjusting the displacement of the load sensing pump by itself, to cause the power source to drive the load sensing pump to supply a corresponding amount of oil, so that a system pressure outputted by the load sensing pump matches the maximum load pressure $p_2$, and at this time the load balancing actuator operates in a generator mode; and when the system working condition is that the hybrid actuator acts in combination with the first hydraulic actuator in the overrunning mode, adjusting, by the control device, the rotational speed of the power source, or adjusting, by the load sensing pump, its displacement by itself, to cause the power source to drive the load sensing pump to output a corresponding amount of oil, so that the system pressure outputted by the load sensing pump matches the maximum load pressure $p_2$, letting a difference between $p_1$ and $p_2$ be a third pressure, and on the premise that the second pressure compensator corresponding to the hybrid actuator does not act, driving, by the motor, the load balancing actuator to output a force or torque of a corresponding magnitude in the direction opposite to the movement direction of the second hydraulic actuator and opposite to the direction of the load, where the force or torque outputted by the load balancing actuator is equal to the sum of the external load on the second hydraulic actuator and the force or torque outputted by the second hydraulic actuator when the load applies the third pressure to the second hydraulic actuator, and at this time the load balancing actuator operates in the generator mode.

In another alternative implementation, in the step S100, when it is determined that the hybrid actuator does not act according to the action signal, the control device adjusts the rotational speed of the power source, or the load sensing pump adjusts its displacement by itself, to cause the power source to drive the load sensing pump to provide a corresponding amount of oil, so that the system pressure outputted by the load sensing pump matches the maximum load pressure of the hybrid actuator and the first hydraulic actuator, and each first pressure compensator or second pressure compensator is used to adjust the pressure supplied to the corresponding first hydraulic actuator or second hydraulic actuator.

The present invention has the beneficial effects as follows.

1. According to the present invention, the second hydraulic actuator and the load balancing actuator in the hybrid actuator jointly bear the external load borne by the hybrid actuator, such that the sum of the forces or torques outputted by the second hydraulic actuator and the load balancing actuator is equal to the external load borne by the hybrid actuator, and by adjusting the force or torque outputted by the load balancing actuator, the pressure required for the second hydraulic actuator to bear the corresponding part of the load can be changed, so that the load pressure of the second hydraulic actuator can match the load pressures of the first hydraulic actuators on other branches. It can be seen that the load balancing actuator can compensate for the load difference of hydraulic actuator, making the load pressure similar, which can reduce the output power of the load sensing pump and decrease the throttling loss of the pressure compensator on the branch. The present invention takes advantage of the characteristic that the motor of the load balancing actuator can operate in the generator mode, enabling the recovery of the potential energy in the system and the energy that would otherwise be consumed on the pressure compensator due to the load difference, thus improving the energy efficiency of the system.

2. According to the present invention, when only one first hydraulic actuator exists, the normal operation of each actuator can be realized even if the load difference exceeds the maximum balancing power of the load balancing actuator.
3. According to the present invention, when a plurality of first hydraulic actuators exist, the potential energy of the system and the energy that would otherwise be consumed on the pressure compensator can also be recovered by using the load balancing actuator in the hybrid actuator.
4. According to the present invention, when a plurality of first hydraulic actuator exist, the normal operation of each actuator can be realized even if the load difference exceeds the maximum balancing power of the load balancing actuator.

DETAILED DESCRIPTION OF PREFERRED EMBODIMENTS

In order to enable those skilled in the art to better understand technical solutions in embodiments of the present invention, and to make the above-described objects, features and advantages of the embodiments of the present invention more obvious and easy to understand, the technical solutions in the embodiments of the present invention will be described in further detail below with reference to the accompanying drawings.

In the description of the present invention, unless otherwise specified and limited, it should be noted that the term "connected" should be understood in a broad sense, for example, it may mean "mechanically connected" or "electrically connected", or may be internal communication between two elements, or may be directly connected, or may be indirectly connected through an intermediate medium. For those skilled in the art, the specific meaning of the above term can be understood according to the specific situation.

Figure 1:
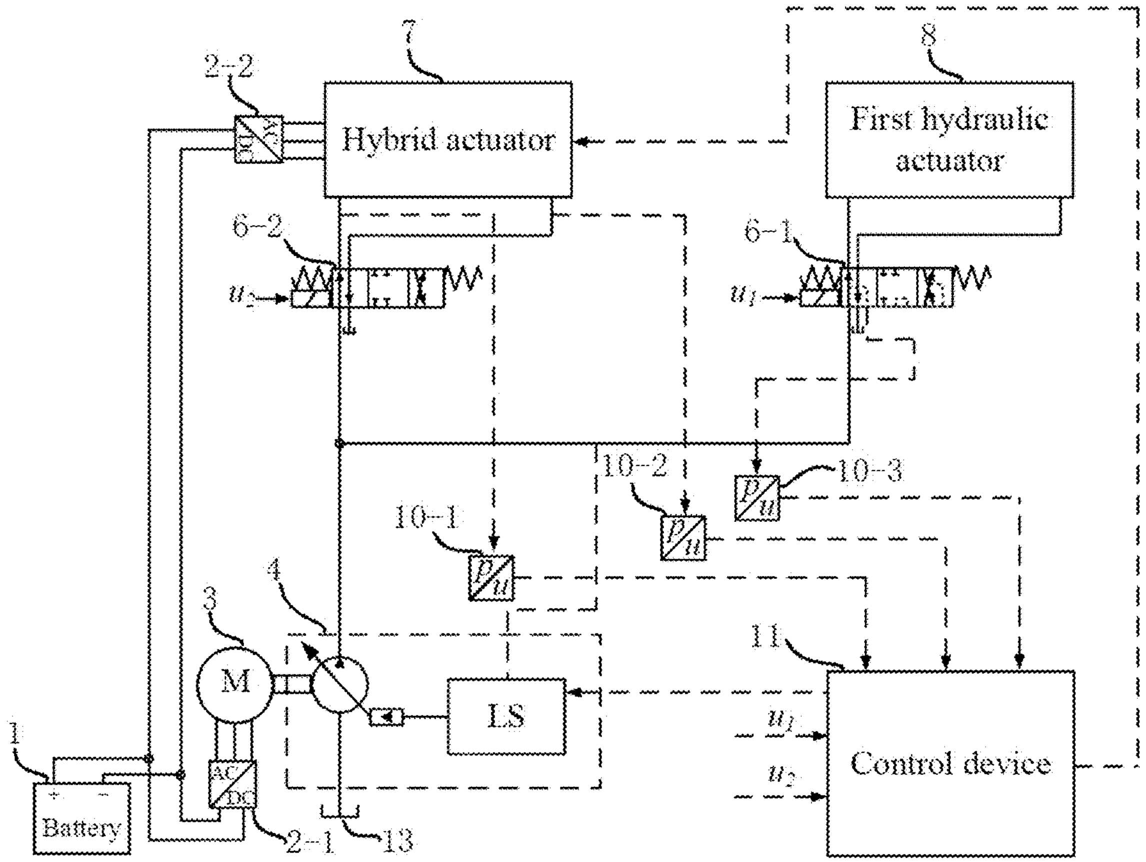
FIG. 1 is a structural schematic diagram of a hybrid electro-hydraulic load sensing system according to an embodiment of the present invention.

As shown in FIG. 1, it is a structural schematic diagram of a hybrid electro-hydraulic load sensing system according to an embodiment of the present invention. The hybrid electro-hydraulic load sensing system may include a battery 1, a first inverter 2-1, a second inverter 2-2, a power source 3, a load sensing pump 4, a hybrid actuator 7 and a first hydraulic actuator 8, where the hybrid actuator 7 may include a second hydraulic actuator and a load balancing actuator which are connected in parallel, the battery 1 is connected to the power source 3 through the first inverter 2-1 and connected to the load balancing actuator through the second inverter 2-2, the power source 3 is connected to the load sensing pump 4, the load sensing pump 4 is connected to the first hydraulic actuator 8 through a first control valve 6-1 and connected to the second hydraulic actuator through a second control valve 6-2, and a first pressure sensor 10-1 and a second pressure sensor 10-2 are disposed at an inlet and an outlet of the second hydraulic actuator respectively; and a control device 11 may be respectively connected to the first pressure sensor 10-1, the second pressure sensor 10-2, a third pressure sensor 10-3, a motor of the load balancing actuator and one oil control assembly in the power source 3 and the load sensing pump 4, the control device firstly initiates operation by analyzing pressure data from the first pressure sensor 10-1 and second pressure sensor 10-2 alongside incoming action signals to determine the hybrid actuator 7's operational mode. Using this mode selection and sensor inputs, it calculates the second hydraulic actuator's load pressure ($p_1$). Simultaneously, the system monitors the first hydraulic actuator 8's maximum load pressure ($p_2$) through the third pressure sensor 10-3. Based on these pressure values ($p_1$ and $p_2$) and the received action commands, the device coordinates two parallel control actions: it regulates the oil control assembly to adjust the load sensing pump 4's output flow, while controlling the motor to manage both magnitude and direction of the force/torque in the load balancing actuator. So that the load balancing actuator recovers a throttling loss, caused by a load difference between the actuators, and potential energy, generated in a process that the hybrid actuator 7 drives the load to move, into the battery 1.

In this embodiment, when only one first hydraulic actuator exists, the third pressure sensor 10-3 may be disposed at a load feedback port of the first control valve 6-1, and the maximum load pressure $p_2$ is a load pressure of the first hydraulic actuator. An outlet of the load sensing pump 4 may be connected to a first inlet of the corresponding first control valve 6-1, an outlet of the first control valve 6-1 may be connected to an inlet of the first hydraulic actuator 8, and an outlet of the first hydraulic actuator 8 may be connected to a second inlet of the first control valve 6-1; the outlet of the load sensing pump 4 may also be connected to an inlet of the corresponding second control valve 6-2, an outlet of the second control valve 6-2 may be connected to the inlet of the corresponding second hydraulic actuator, and the outlet of the second hydraulic actuator may be connected to a second inlet of the second control valve 6-2. The power source 3 may be used to drive the load sensing pump 4, and the load sensing pump 4 is used to supply oil to all actuators.

Figure 2:
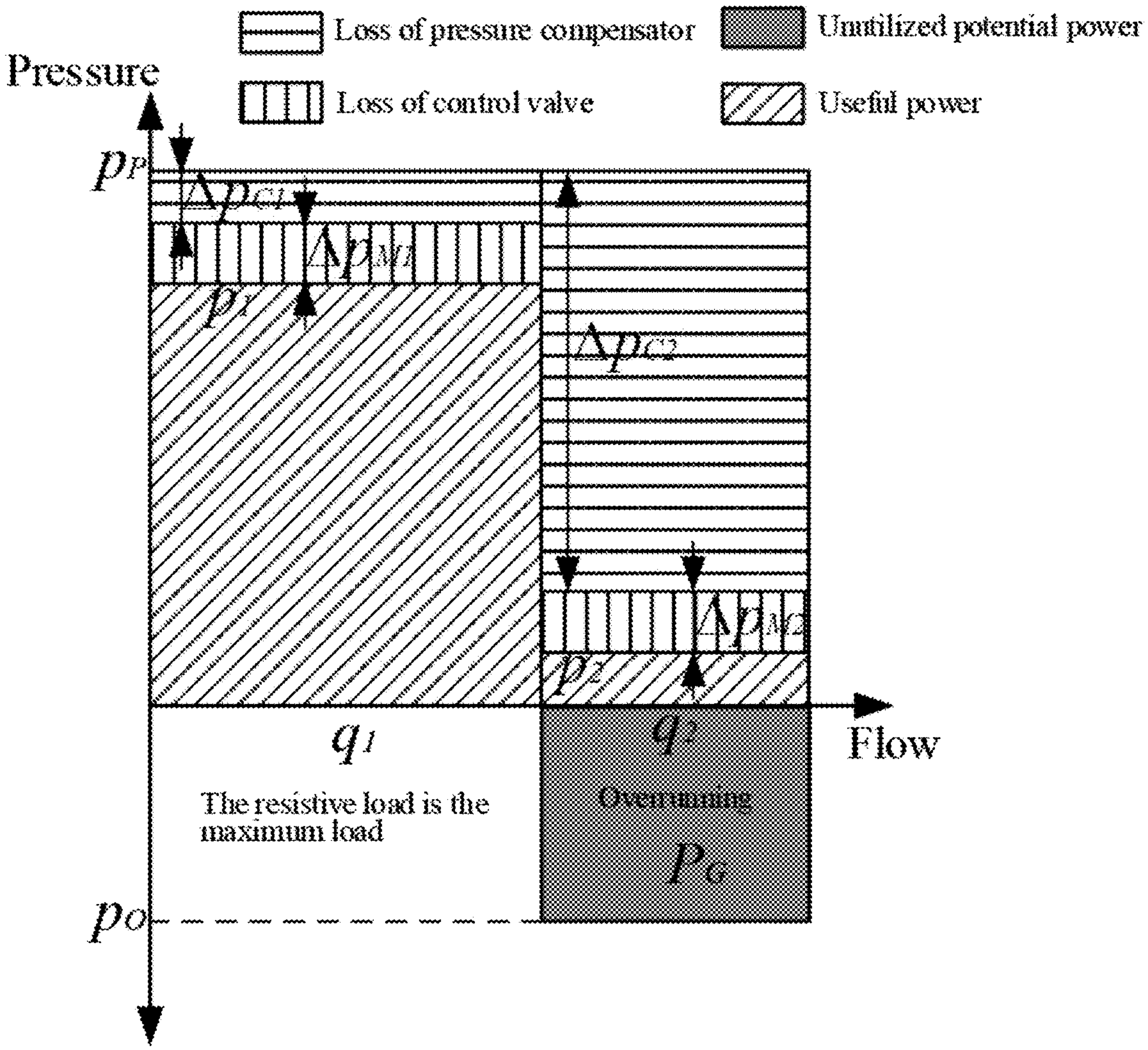
FIG. 2 is a characteristic diagram of energy consumption of a traditional load sensing system.
Figure 3:
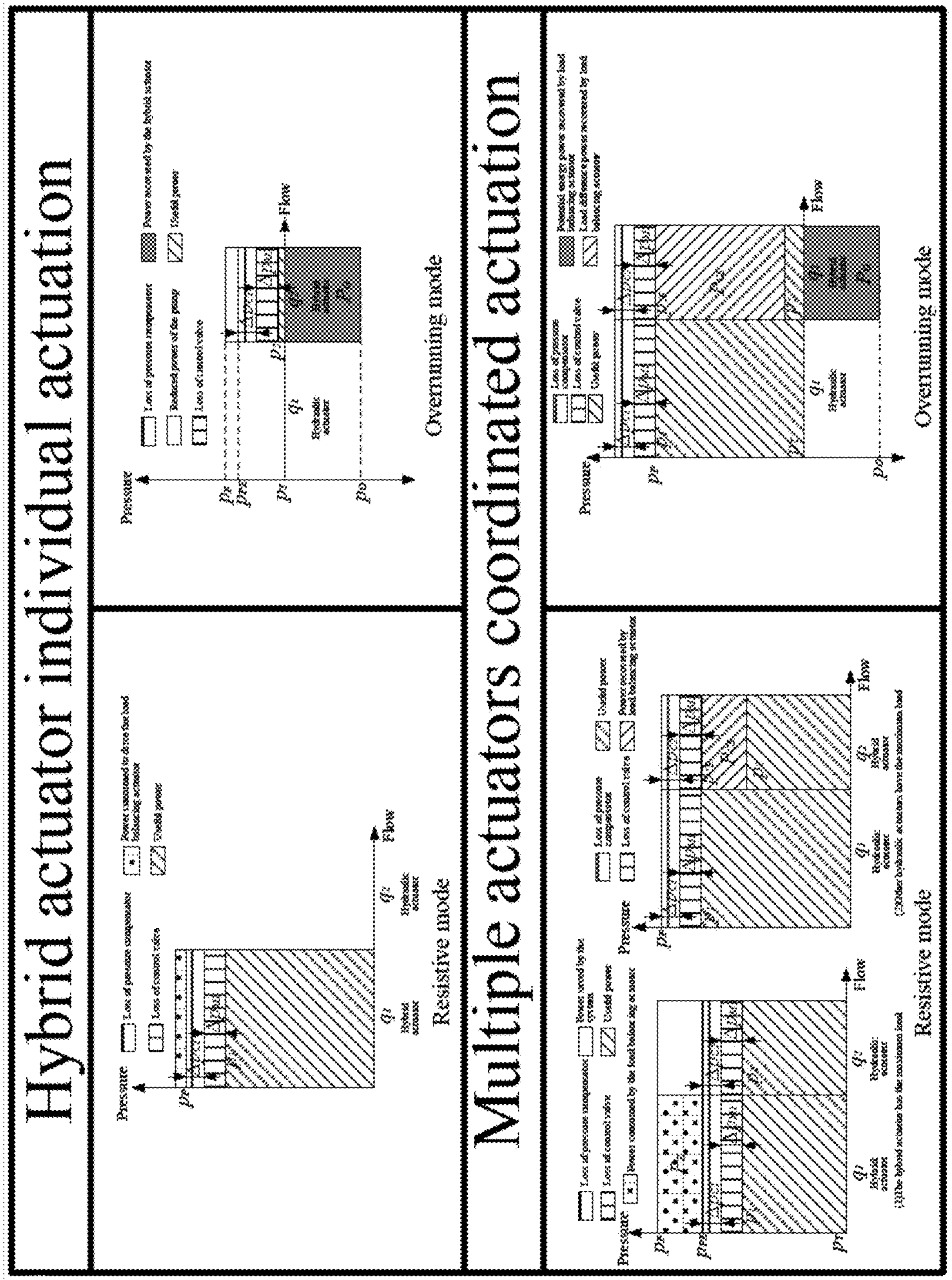
FIG. 3 is a characteristic diagram of energy consumption of a hybrid electro-hydraulic load sensing system under four working conditions in the present invention.

In combination with the characteristic diagram of energy consumption of the traditional load sensing system shown in FIG. 2 and the characteristic diagram of energy consumption of the hybrid electro-hydraulic load sensing system of the present invention shown in FIG. 3, it can be seen from FIG. 2 that it is necessary to control the output pressure $p_P$ based on the maximum load pressure of the actuator, while the pressure used by a low-load actuator to bear the load is only $p_2$, thus a large amount of pressure loss $\Delta p_{c2}$ will occur on the pressure compensator. Compared with the loss $\Delta p_{c1}$ of the pressure compensator of a high-load actuator, a large amount of power is wasted. In addition, there is potential power $p_G$ that is not fully utilized under the overrunning condition, resulting in the fact that the energy efficiency of the load sensing system is still low when supplying oil to the plurality of actuators. For this reason, the present invention provides a hybrid electro-hydraulic load sensing system, which can effectively reduce the energy loss caused by the load difference and recover potential energy, thus improving the energy efficiency of the system. Specifically, the control device 11 of the present invention can perform system control according to the following steps:

step S100: after receiving an action signal, judging whether the system will be in a state of an independent action of the hybrid actuator 7 or a state of a combined action of the hybrid actuator 7 and the first hydraulic actuator 8 according to the action signal, and sending the action signal to the control valves corresponding to the hybrid actuator 7 and the first hydraulic actuator 8, so as to switch the control valves, thereby switching the system to the corresponding action state.

step S200: calculating a force or torque of the second hydraulic actuator based on pressures in two chambers of the second hydraulic actuator in the hybrid actuator 7 detected by the first pressure sensor 6-1 and the second pressure sensor 6-2, determining a direction of the force or torque of a current load on the hybrid actuator 7 according to the calculated force or torque of the second hydraulic actuator and the force or torque currently outputted by the load balancing actuator in the hybrid actuator 7, determining, according to the action signal, a movement direction that the hybrid actuator 7 is about to enter after the system is switched to the corresponding action state, and judging whether the hybrid actuator 7 is in an resistive mode or an overrunning mode according to the direction of the force or torque of the current load and the movement direction.

In this step, the first pressure sensor 10-1 and the second pressure sensor 10-2, which are respectively disposed at the inlet and the outlet of the second hydraulic actuator, are used to detect pressures in corresponding chambers of the second hydraulic actuator, and the control device 11 calculates the force or torque of the second hydraulic actuator according to the pressures of the two chambers of the second hydraulic actuator and effective acting areas or displacements of the chambers. Judging whether the hybrid actuator 7 is in an resistive mode or an overrunning mode according to the direction of the force or torque of the load and the movement direction in the step S200 includes: when the direction of the force or torque of the load is opposite to the movement direction, the hybrid actuator 7 being in the resistive mode; and when the direction of the force or torque of the load is the same as the movement direction, the hybrid actuator 7 being in the overrunning mode.

Before the step S300, the control method may further include: obtaining the load pressure $p_1$ of the second hydraulic actuator according to the pressures detected by the first pressure sensor 10-1 and the second pressure sensor 10-2 and the determined mode, the load pressure $p_1$ is the inlet pressure of the hybrid actuator; when the hybrid actuator is a hybrid cylinder, if the hybrid cylinder is extending, then the load pressure $p_1$ being a pressure detected by the corresponding pressure sensor connected to a rodless chamber in the second hydraulic actuator; and if the hybrid cylinder is retracting, the load pressure $p_1$ being a pressure detected by the corresponding pressure sensor connected to a rod chamber in the second hydraulic actuator.

step S300: dividing system working conditions based on the action state and the mode. Based on the system working conditions and these pressure values ($p_1$ and $p_2$), regulating the oil control assembly to adjust the load sensing pump 4's output flow, while controlling the motor to manage both magnitude and direction of the force/torque in the load balancing actuator. So that the load balancing actuator recovers a throttling loss, caused by a load difference between the actuators, and potential energy, generated in a process that the hybrid actuator 7 drives the load to move, into the battery 1. The step S300 may specifically include:

when the system working condition is that the hybrid actuator acts alone in the resistive mode, the motor of the load balancing actuator being unable to operate in a generator mode, controlling the motor of the load balancing actuator not to act, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, and at this time the second hydraulic actuator bearing all the loads and driving the load balancing actuator to move along.

Under this system working condition, since only one actuator of the hybrid actuator operates in the system, there is no energy loss caused by the load difference; in addition, when the hybrid actuator is in the resistive mode, the direction of the current load on the hybrid actuator is opposite to the movement direction it is about to enter, so that the motor of the load balancing actuator cannot operate in generator mode, the load balancing actuator does not work at this time, the second hydraulic actuator bears all the loads that the hybrid actuator needs to bear, and at this time, the second hydraulic actuator also needs to drive the load balancing actuator to follow the movement synchronously. It can be seen that under this system working condition, compared with the traditional load sensing system, the hybrid electro-hydraulic load sensing system of the present invention consumes more energy, but the increased energy consumption is relatively small.

When the system working condition is that the hybrid actuator acts alone in the overrunning mode, controlling the motor to drive the load balancing actuator to output a force or torque of a corresponding magnitude in a direction opposite to the direction of the load to cause the load balancing actuator to bear all the loads and operates in the generator mode, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, thereby enabling the second hydraulic actuator to follow the movement of the load balancing actuator.

Under this system working condition, when the hybrid actuator is in the overrunning mode, the direction of the current load on the hybrid actuator is the same as the movement direction it is about to enter, so that the motor of the load balancing actuator can operate in generator mode, at this time the load balancing actuator bears all the loads that the hybrid actuator needs to bear, and the second hydraulic actuator only needs to follow the movement of the load balancing actuator. In order to ensure that the second hydraulic actuator follows the movement of the load balancing actuator, the power source drives the load sensing pump to supply the corresponding amount of oil. It can be seen that under this system working condition, the second hydraulic actuator in the traditional load sensing system bears all the loads, while the second hydraulic actuator in the present invention only needs to follow the movement of the load balancing actuator, so that the pressure outputted by the load sensing pump in the present invention is lower, and less energy is consumed. In addition, under this system working condition, the load balancing actuator that bears all the loads operates in the generator mode, and the load balancing actuator can recover the potential energy generated by the movement of the load while driving the load to move.

when the system working condition is that the hybrid actuator acts in combination with the first hydraulic actuator in the resistive mode, comparing the load pressure $p_1$ with the maximum load pressure $p_2$ of the first hydraulic actuator detected by the third pressure sensor:

if $p_1>p_2$, then on the premise that the second pressure compensator corresponding to the hybrid actuator does not act, controlling the motor to drive the load balancing actuator to output a force or torque of corresponding magnitude in a direction the same as the movement direction of the second hydraulic actuator and opposite to the direction of the load, letting a difference between $p_1$ and $p_2$ be a first pressure, and the force or torque outputted by the load balancing actuator is equal to the force or torque outputted by the second hydraulic actuator when the load applies the first pressure to the second hydraulic actuator, adjusting, by the control device, the rotational speed of the power source, or adjusting the displacement of the load sensing pump by itself, to cause the power source to drive the load sensing pump to output a corresponding amount of oil, so that a system pressure outputted by the load sensing pump matches the maximum load pressure $p_2$, and at this time the load balancing actuator operates in an energy consumption mode; and if $p_1<p_2$, then on the premise that the second pressure compensator corresponding to the hybrid actuator does not act, controlling the motor to drive the load balancing actuator to output a force or torque of corresponding magnitude in a direction opposite to the movement direction of the second hydraulic actuator and the same as the direction of the load, letting a difference between $p_1$ and $p_2$ be a second pressure, the force or torque outputted by the load balancing actuator is equal to the force or torque outputted by the second hydraulic actuator when the load applies the second pressure to the second hydraulic actuator, adjusting, by the control device, the rotational speed of the power source, or adjusting the displacement of the load sensing pump by itself, to cause the power source to drive the load sensing pump to output a corresponding amount of oil, so that a system pressure outputted by the load sensing pump matches the maximum load pressure $p_2$, and at this time the load balancing actuator operates in a generator mode.

Under this system working condition, when $p_1>p_2$, the load pressure $p_1$ of the second hydraulic actuator as the maximum load pressure of the system is reduced to $p_2$; compared with the traditional load sensing system, the pressure outputted by the load sensing pump of the present invention is reduced from $p_P$ to $p_{PE}$, and correspondingly the power consumed by the load sensing pump is reduced from $p_P$ to $p_{PE}$. Since the power consumed is $p_E$ when the load balancing actuator operates in the energy consumption mode if $p_1>p_2$, the power consumed by the present invention is the sum of $p_{PE}$ and $p_E$. Compared with the traditional load sensing system, the power saved by the present invention is obtained by subtracting the sum of $p_{PE}$ and $p_E$ from $p_P$.

Under this system working condition, when $p_1<p_2$, the maximum load pressure of the system at this time is $p_2$, the pressure delivered by the load sensing pump to the first hydraulic actuator and the second hydraulic actuator is $p_2$, and through load balancing by the load balancing actuator, the load pressure $p_1$ of the second hydraulic actuator is increased to $p_2$ to reduce the load difference between the actuators. At this time, there is no need for the second pressure compensator to reduce the pressure $p_2$ to $p_1$ by throttling to achieve the load matching of the second hydraulic actuator, and at this time the load balancing actuator operates in the generator mode, so that the energy loss that would otherwise be generated by throttling on the pressure compensator in the traditional load sensing system can be recovered by the load balancing actuator to the battery.

When the system working condition is that the hybrid actuator acts in combination with the first hydraulic actuator in the overrunning mode, adjusting, by the control device, the rotational speed of the power source, or adjusting, by the load sensing pump, its displacement by itself, to cause the power source to drive the load sensing pump to output a corresponding amount of oil, so that the system pressure outputted by the load sensing pump matches the maximum load pressure $p_2$, letting a difference between $p_1$ and $p_2$ be a third pressure, and on the premise that the second pressure compensator corresponding to the hybrid actuator does not act, driving, by the motor, the load balancing actuator to output a force or torque of a corresponding magnitude in the direction opposite to the movement direction of the second hydraulic actuator and opposite to the direction of the load, where the force or torque outputted by the load balancing actuator is equal to the sum of the external load on the second hydraulic actuator and the force or torque outputted by the second hydraulic actuator when the load applies the third pressure to the second hydraulic actuator, and at this time the load balancing actuator operates in the generator mode. The control device 11 can calculate the force or torque outputted by the second hydraulic actuator when the load applies third pressure, using both the third pressure and the effective chamber area/displacement of the second hydraulic actuator. Under this condition, since the hybrid actuator is in the overrunning mode, the traditional load sensing system in this mode balances an external load by throttling a valve port, which wastes a lot of potential energy. The hybrid electro-hydraulic load sensing system recovers the potential energy of this part of the load through the load balancing actuator, and the output pressure of the load sensing pump only needs to match the load pressure of the first hydraulic actuator $p_2$, and at this time the magnitude of the force or torque outputted by the load balancing actuator is equal to the sum of the external load and the force or torque generated by the third pressure on the second hydraulic actuator. The load balancing actuator recovers the potential energy of the external load and the energy to the second hydraulic actuator delivered by the load sensing pump.

Figure 4:
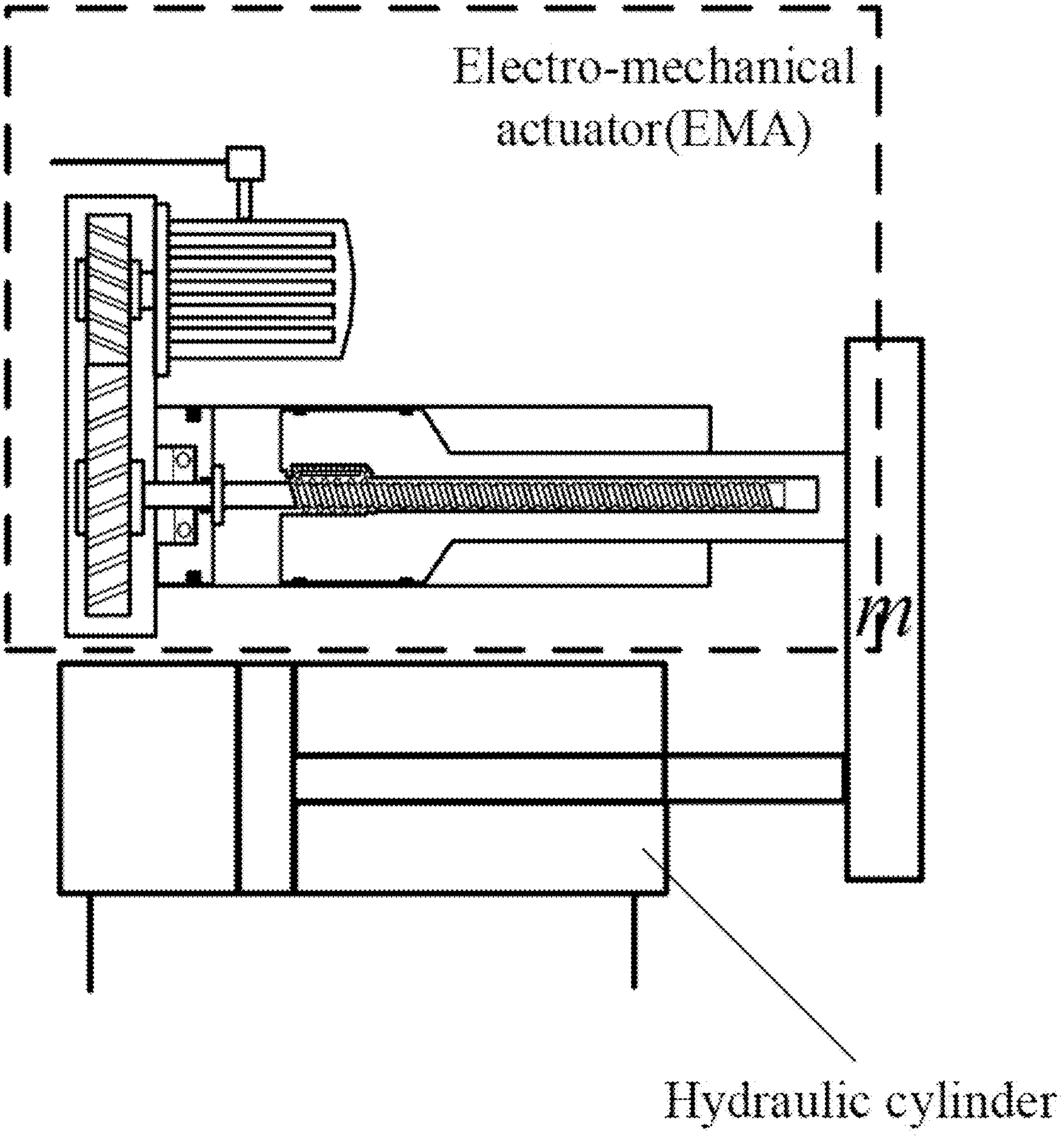
FIG. 4 is a structural schematic diagram of an embodiment of the hybrid actuator of the present invention.
Figure 5:
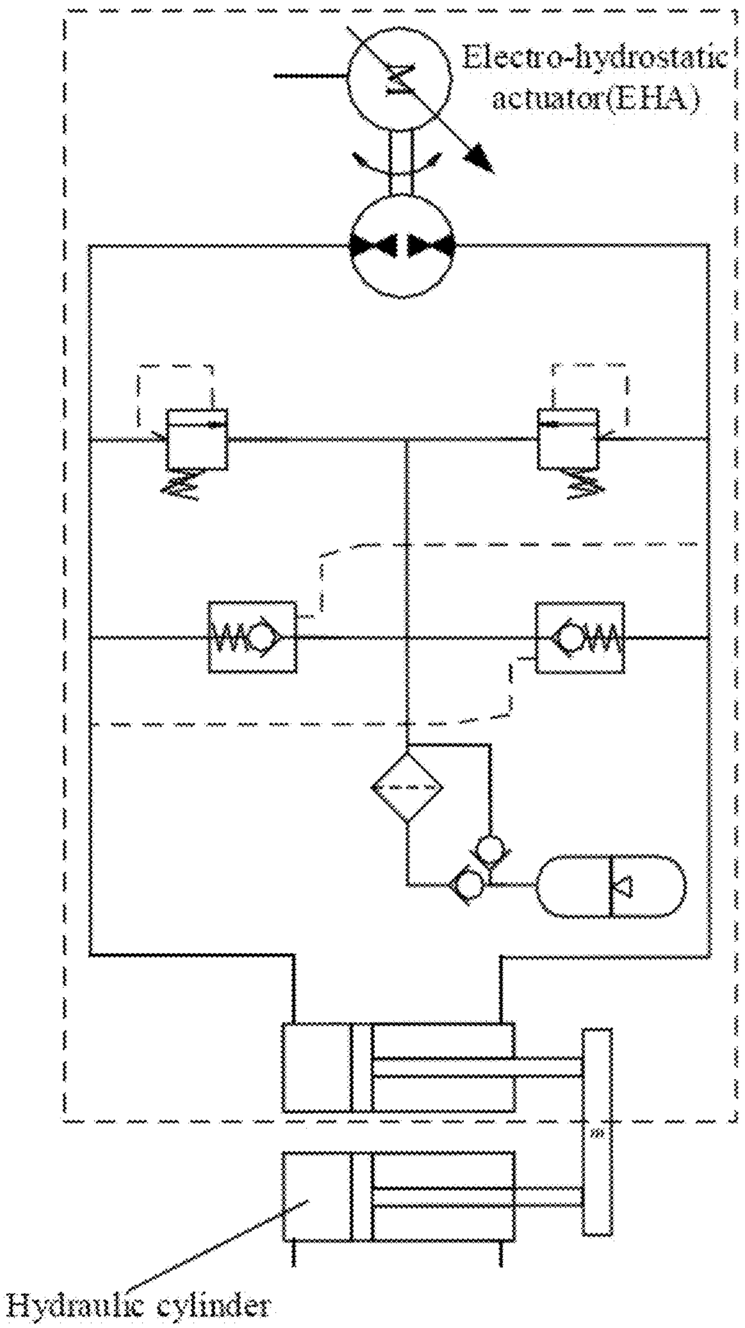
FIG. 5 is a structural schematic diagram of another embodiment of the hybrid actuator of the present invention.
Figure 6:
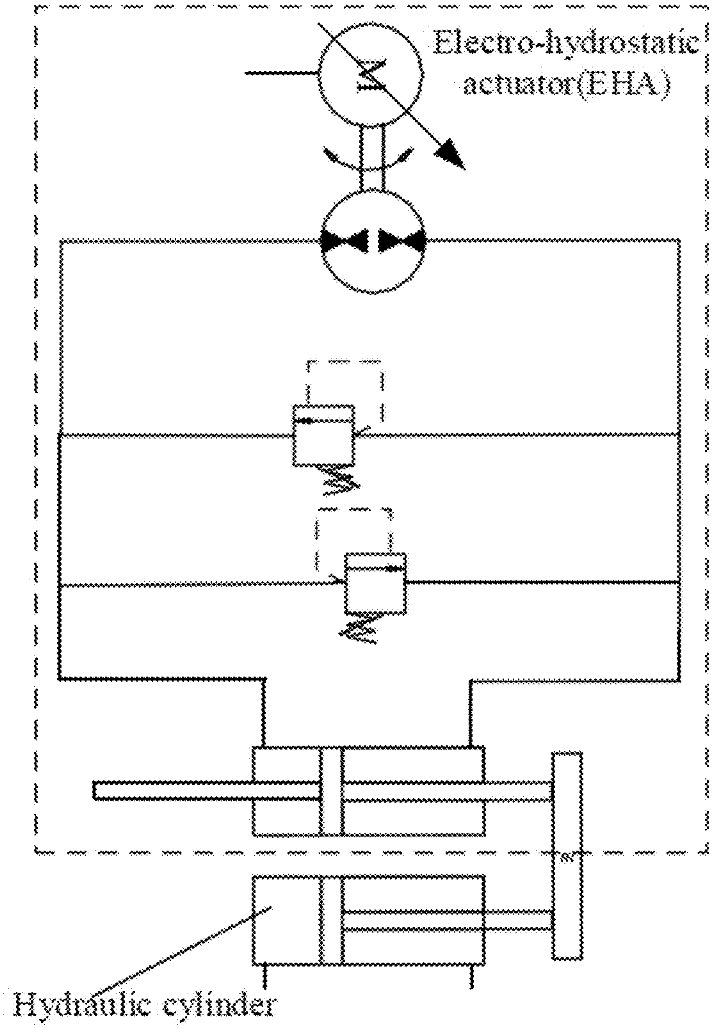
FIG. 6 is a structural schematic diagram of yet another embodiment of the hybrid actuator of the present invention.
Figure 7:
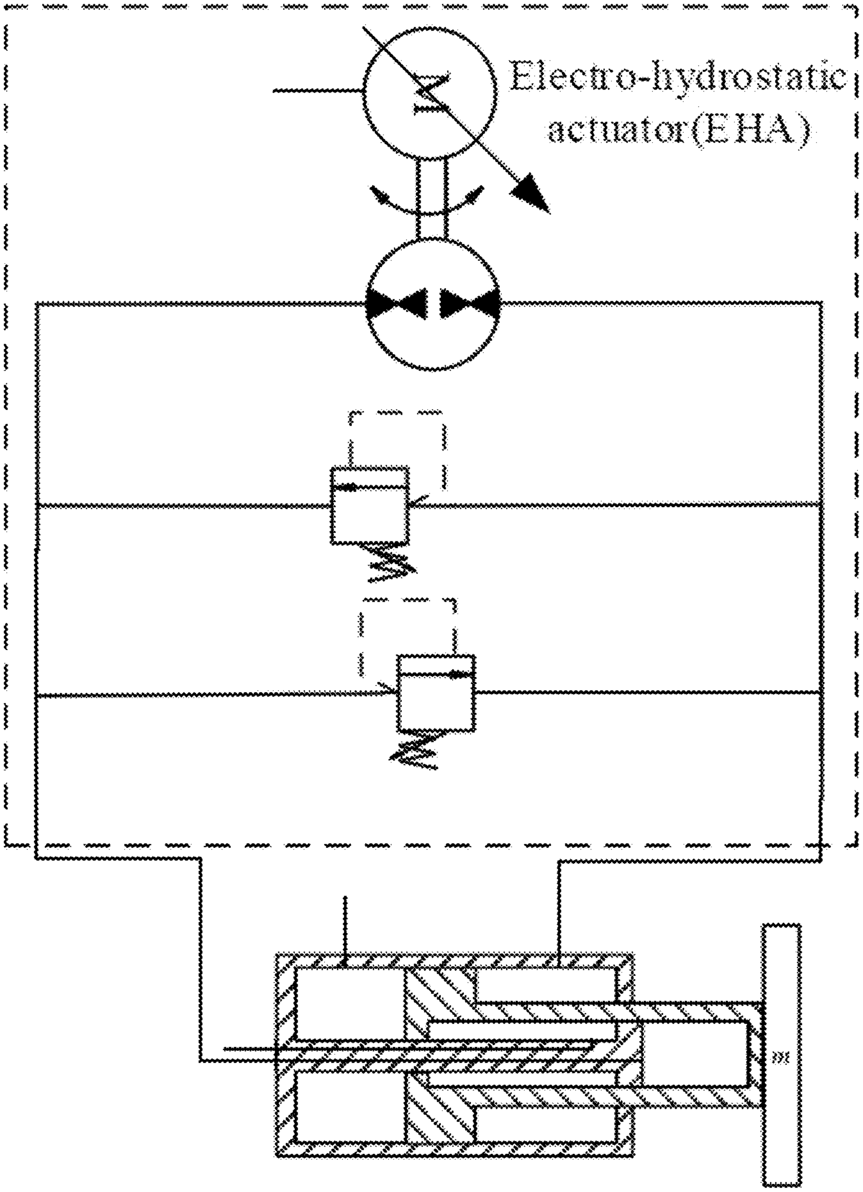
FIG. 7 is a structural schematic diagram of still another embodiment of the hybrid actuator of the present invention.

In this embodiment, as shown in FIGS. 4, 5 and 6, the hybrid actuator 7 may be a hybrid cylinder composed of a hydraulic cylinder and an electro-mechanical actuator which are connected in parallel, or a hybrid cylinder composed of a hydraulic cylinder and an electro-hydrostatic actuator which are connected in parallel, or a hybrid motor composed of a hydraulic motor and an electric motor which are connected in parallel; the power source may be an electric machine or an engine; and the first hydraulic actuator may be a hydraulic cylinder or a hydraulic motor, where the difference between FIG. 6 and FIG. 5 is that the hydraulic cylinder of the electro-hydrostatic actuator of FIG. 6 is a symmetrical cylinder, and there is no need for two check valves for distributing oil in this EHA system. In FIG. 7, the two hydraulic cylinders in FIG. 6 are integrated to make the whole device more compact.

It can be seen from the above embodiments that the second hydraulic actuator and the load balancing actuator in the hybrid actuator of the present invention jointly bear the external load borne by the hybrid actuator, such that the sum of the forces or torques outputted by the second hydraulic actuator and the load balancing actuator is equal to the external load borne by the hybrid actuator, and by adjusting the force or torque outputted by the load balancing actuator, the output pressure required for the second hydraulic actuator to bear the corresponding part of the load can be changed, so that the load pressure of the second hydraulic actuator can match the load pressures of the first hydraulic actuators on other branches. It can be seen that the load balancing actuator can compensate for the load difference of each hydraulic actuator, making the load pressure on each branch similar, which can reduce the output power of the load sensing pump and decrease the throttling loss of the pressure compensator on the branch. The present invention takes advantage of the characteristic that the motor of the load balancing actuator can operate in the generator mode, enabling the recovery of the potential energy in the system and the energy that would otherwise be consumed on the pressure compensator due to the load difference, thus improving the energy efficiency of the system.

Figure 8:
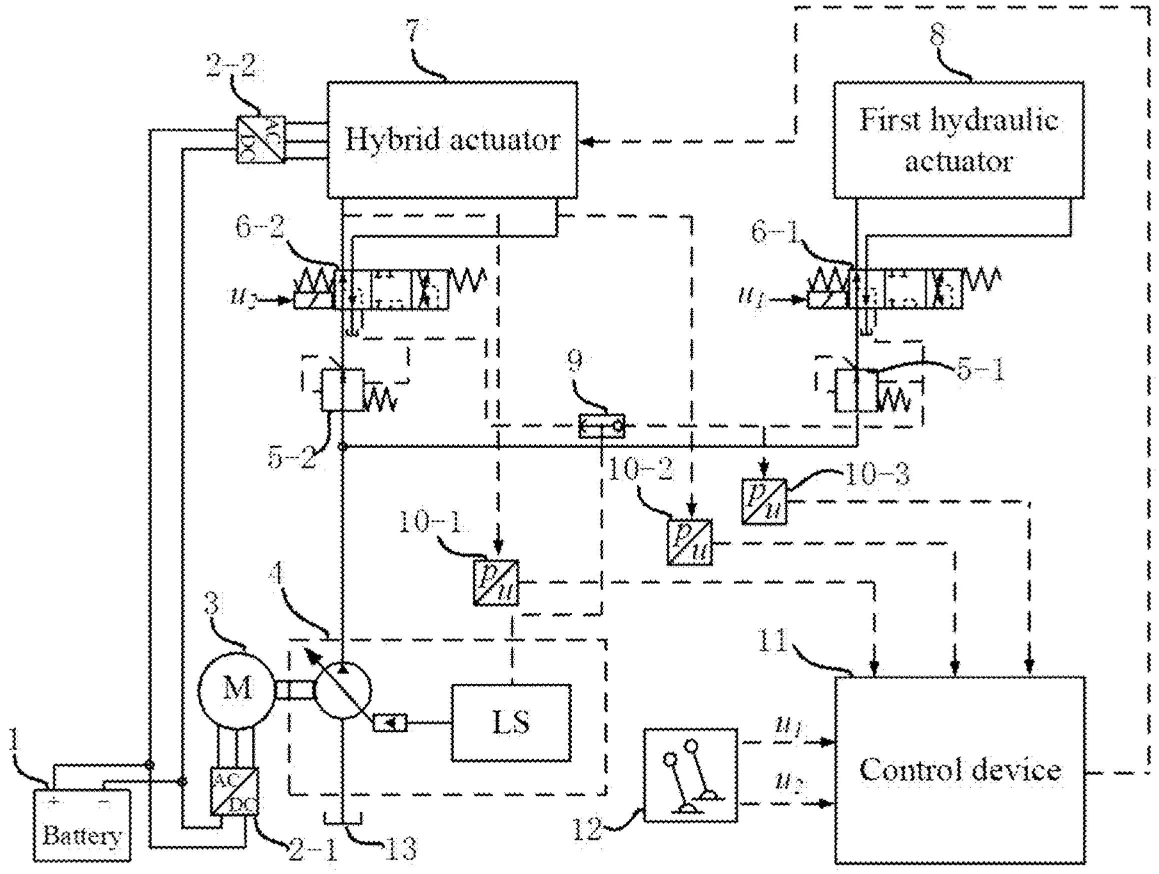
FIG. 8 is a structural schematic diagram of another embodiment of the hybrid electro-hydraulic load sensing system of the present invention.

Referring to FIG. 8, it is a structural schematic diagram of another embodiment of the hybrid electro-hydraulic load sensing system of the present invention. Only one first hydraulic actuator exists in the hybrid electro-hydraulic load sensing system shown in FIG. 8 and FIG. 1. The difference between the two embodiments is that the hybrid electro-hydraulic load sensing system shown in FIG. 8 can further include a first pressure compensator 5-1, a second pressure compensator 5-2 and a second shuttle valve 9, the first pressure compensator 5-1 is disposed between the first control valve 6-1 corresponding to the first hydraulic actuator 8 and the load sensing pump 4, a load feedback port of the first control valve 6-1 is connected to a pilot port of its corresponding first pressure compensator 5-1, the second pressure compensator 5-2 is disposed between the second control valve 6-2 and the load sensing pump 4, the load feedback port of the second control valve 6-2 is connected to a pilot port of the second pressure compensator 5-2, a first inlet of the second shuttle valve 9 is connected to the load feedback port of the second control valve 6-2, a second inlet of the second shuttle valve is connected to the load feedback port of the first control valve 6-1, an outlet of the second shuttle valve 9 is connected to the load sensing pump 4 or a fourth pressure sensor, and the outlet of the second shuttle valve 9 screens out the maximum load pressure of the hybrid actuator 7 and the first hydraulic actuator 8; when the load difference exceeds a maximum balancing power of the load balancing actuator, resulting in an abnormal operating state of the system, the control device adjusts a rotational speed of the power source according to a pressure detected by the fourth pressure sensor, or the load sensing pump adjusts its displacement by itself, to cause the power source to drive the load sensing pump to supply a corresponding amount of oil, so that a system pressure outputted by the load sensing pump 4 is equal to the maximum load pressure of the hybrid actuator 7 and the first hydraulic actuator 8, and the first pressure compensator 5-1 or the second pressure compensator 5-2 is used to adjust the pressure supplied to the first hydraulic actuator 8 or the second hydraulic actuator.

It can be seen from the above embodiments that the second hydraulic actuator and the load balancing actuator in the hybrid actuator of the present invention jointly bear the external load borne by the hybrid actuator, such that the sum of the forces or torques outputted by the second hydraulic actuator and the load balancing actuator is equal to the external load borne by the hybrid actuator, and by adjusting the force or torque outputted by the load balancing actuator, the output pressure required for the second hydraulic actuator to bear the corresponding part of the load can be changed, so that the load pressure of the second hydraulic actuator can match the load pressures of the first hydraulic actuators on other branches. It can be seen that the load balancing actuator can compensate for the load difference of each hydraulic actuator, making the load pressure on each branch similar, which can reduce the output power of the load sensing pump and decrease the throttling loss of the pressure compensator on the branch. The present invention takes advantage of the characteristic that the motor of the load balancing actuator can operate in the generator mode, enabling the recovery of the potential energy in the system and the energy that would otherwise be consumed on the pressure compensator due to the load difference, thus improving the energy efficiency of the system. In addition, according to the present invention, when only one first hydraulic actuator exists, the normal operation of each actuator can be realized even if the load difference exceeds the maximum balancing power of the load balancing actuator.

Figure 9:
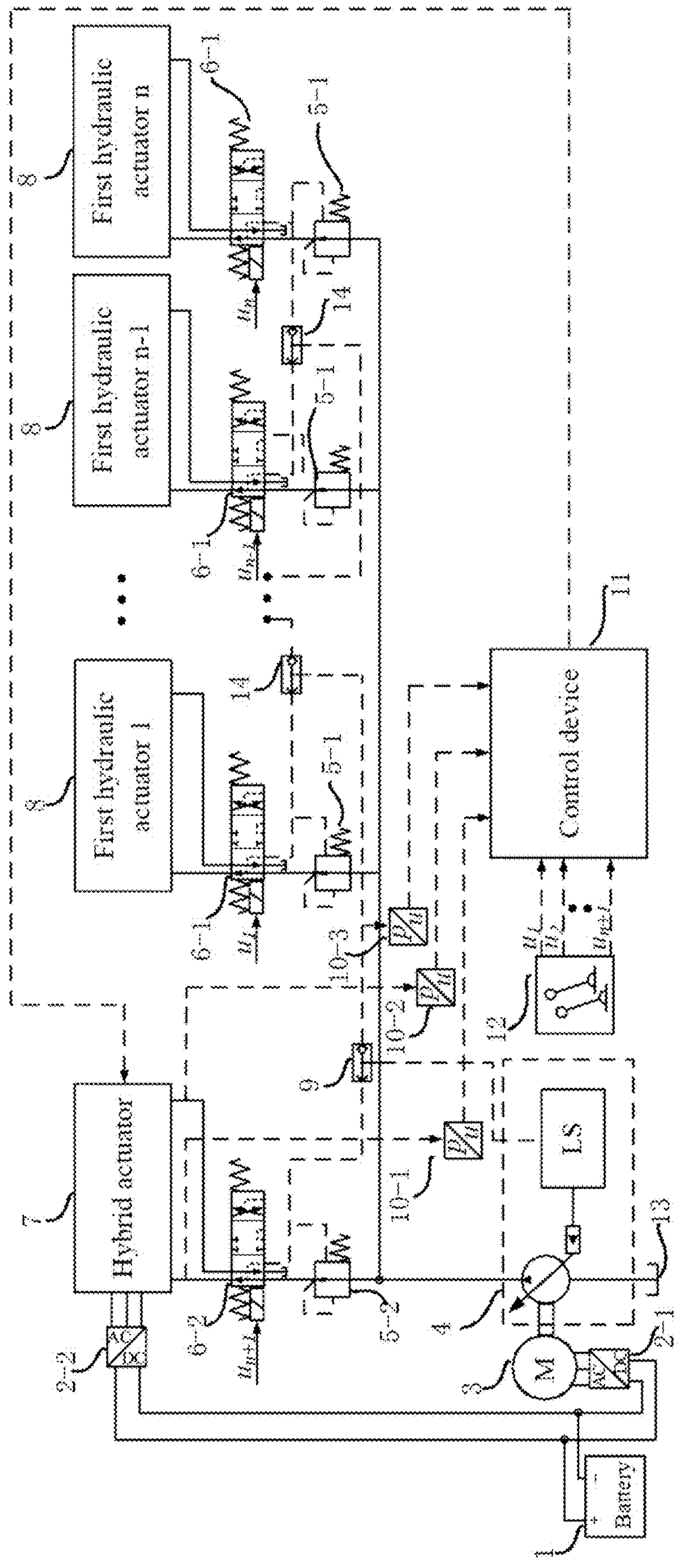
FIG. 9 is a structural schematic diagram of yet another embodiment of the hybrid electro-hydraulic load sensing system of the present invention.

Referring to FIG. 9, it is a structural schematic diagram of yet another embodiment of the hybrid electro-hydraulic load sensing system of the present invention. The hybrid electro-hydraulic load sensing system shown in FIG. 9 differs from that shown in FIG. 1 in that a plurality of first hydraulic actuators 8 exist in the hybrid electro-hydraulic load sensing system shown in FIG. 9, at this time a second pressure compensator 5-2 is also disposed between the second control valve 6-2 and the load sensing pump 5, and the load feedback port of the second control valve 6-2 is connected to the pilot port of the second pressure compensator 5-2; for each first hydraulic actuator 8, a corresponding first pressure compensator 5-1 is also disposed between the first control valve 6-1 corresponding to the first hydraulic actuator 8 and the load sensing pump 4, and the load feedback port of each first control valve 6-1 is connected to the pilot port of its corresponding first pressure compensator 5-1; for every two sequentially adjacent first hydraulic actuators 8, a first shuttle valve 14 is disposed between the two adjacent first hydraulic actuators 8, a first inlet of the first shuttle valve 14 is connected to a load feedback port of first control valve 6-1 corresponding to one of the first hydraulic actuators 8, a second inlet of the first shuttle valve is connected to an outlet of a next first shuttle valve 14, an outlet of the first shuttle valve is connected to a second inlet of a previous first shuttle valve 14, where only the outlet of the first shuttle valve 14 ranking the first is connected to the third pressure sensor 10-3, and only a second inlet of a last first shuttle valve 14 is connected to a load feedback port of the first control valve 6-1 corresponding to another first hydraulic actuator 8, and the maximum load pressure $p_2$ is a maximum load pressure of the plurality of first hydraulic actuators 8.

The hybrid electro-hydraulic load sensing system shown in FIG. 9 may further include a second shuttle valve 9, where a first inlet of the second shuttle valve 9 is connected to the load feedback port of the second control valve 6-2, and a second inlet of the second shuttle valve is connected to the outlet of the first shuttle valve 14 ranking the first; an outlet of the second shuttle valve 9 is connected to the load sensing pump 4 or the fourth pressure sensor, and the outlet of the second shuttle valve 9 screens out the maximum load pressure of the hybrid actuator 7 and the plurality of first hydraulic actuators 8; when the load difference exceeds a maximum balancing power of the load balancing actuator, resulting in an abnormal operating state of the system, the control device adjusts a rotational speed of the power source according to a pressure detected by the fourth pressure sensor, or the load sensing pump adjusts its displacement by itself, to cause the power source 3 to drive the load sensing pump 4 to supply a corresponding amount of oil, so that a system pressure outputted by the load sensing pump 4 is equal to the maximum load pressure of the hybrid actuator 7 and the plurality of first hydraulic actuators 8, and each first pressure compensator 5-1 or second pressure compensator 5-2 is used to adjust the pressure supplied to the corresponding first hydraulic actuator 8 or second hydraulic actuator.

It can be seen from the above embodiments that the second hydraulic actuator and the load balancing actuator in the hybrid actuator of the present invention jointly bear the external load borne by the hybrid actuator, such that the sum of the forces or torques outputted by the second hydraulic actuator and the load balancing actuator is equal to the external load borne by the hybrid actuator, and by adjusting the force or torque outputted by the load balancing actuator, the output pressure required for the second hydraulic actuator to bear the corresponding part of the load can be changed, so that the load pressure of the second hydraulic actuator can match the load pressures of the first hydraulic actuators on other branches. It can be seen that the load balancing actuator can compensate for the load difference of each hydraulic actuator, making the load pressure on each branch similar, which can reduce the output power of the load sensing pump and decrease the throttling loss of the pressure compensator on the branch. The present invention takes advantage of the characteristic that the motor of the load balancing actuator can operate in the generator mode, enabling the recovery of the potential energy in the system and the energy that would otherwise be consumed on the pressure compensator due to the load difference, thus improving the energy efficiency of the system. According to the present invention, when a plurality of first hydraulic actuators exist, the potential energy of the system and the energy that would otherwise be consumed on the pressure compensator can also be recovered by using the load balancing actuator in the hybrid actuator; and when a plurality of first hydraulic actuator exist, the normal operation of each actuator can be realized even if the load difference exceeds the balancing power of the load balancing actuator.

Figure 10:
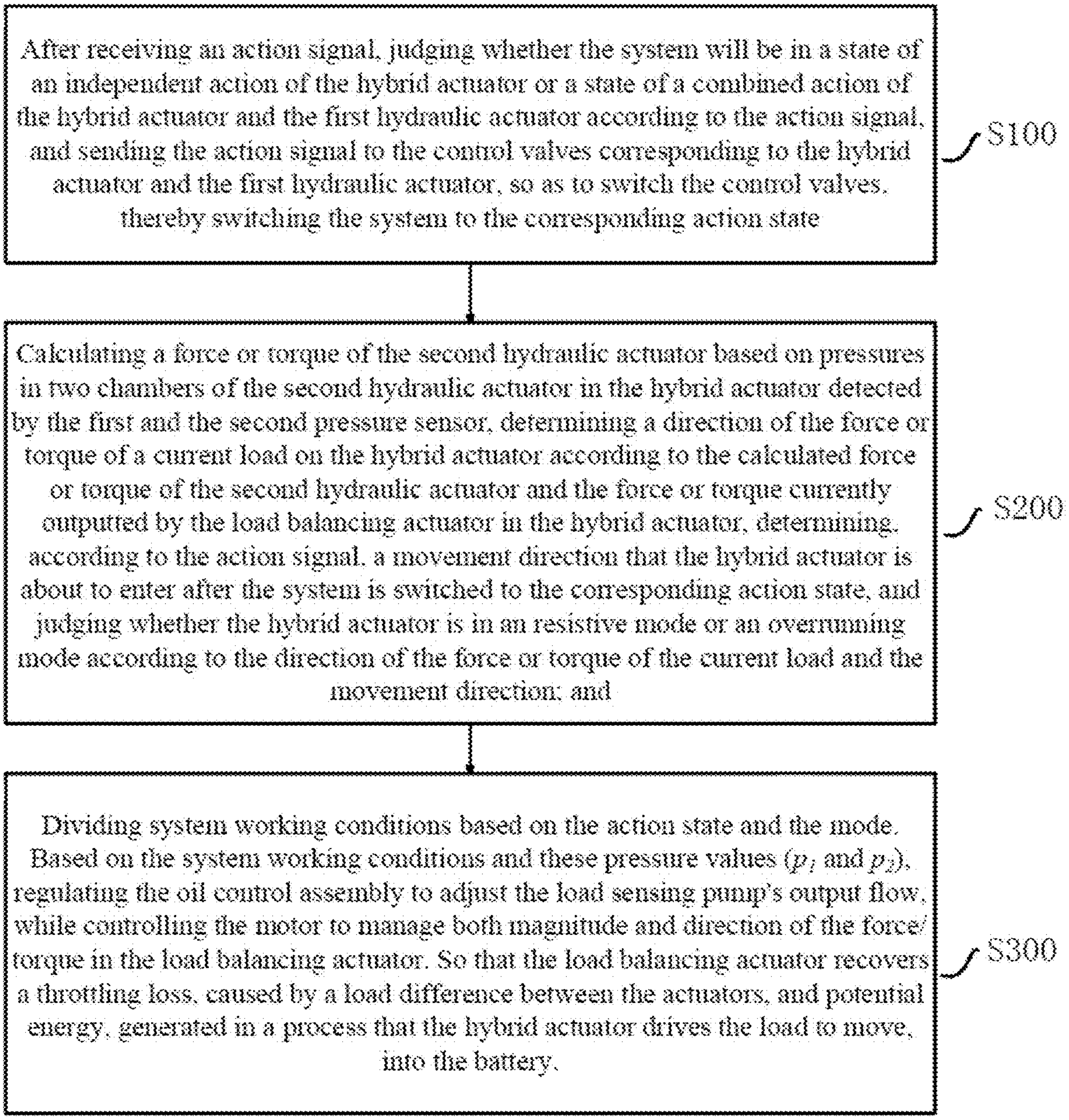
FIG. 10 is a flowchart of an embodiment of a control method of the hybrid electro-hydraulic load sensing system of the present invention.

In addition, as shown in FIG. 10, the present invention also provides a control method of the hybrid electro-hydraulic load sensing system, in which the control device performs system control according to the following steps:

step S100: after receiving an action signal, judging whether the system will be in a state of an independent action of the hybrid actuator or a state of a combined action of the hybrid actuator and the first hydraulic actuator according to the action signal, and sending the action signal to the control valves corresponding to the hybrid actuator and the first hydraulic actuator, so as to switch the control valves, thereby switching the system to the corresponding action state;

step S200: calculating a force or torque of the second hydraulic actuator based on pressures in two chambers of the second hydraulic actuator in the hybrid actuator detected by the first pressure sensor and the second pressure sensor, determining a direction of the force or torque of a current load on the hybrid actuator according to the calculated force or torque of the second hydraulic actuator and the force or torque currently outputted by the load balancing actuator in the hybrid actuator, determining, according to the action signal, a movement direction that the hybrid actuator is about to enter after the system is switched to the corresponding action state, and judging whether the hybrid actuator is in an resistive mode or an overrunning mode according to the direction of the force or torque of the current load and the movement direction; and step S300: dividing system working conditions based on the action state and the mode. Based on the system working conditions and these pressure values ($p_1$ and $p_2$), regulating the oil control assembly to adjust the load sensing pump's output flow, while controlling the motor to manage both magnitude and direction of the force/torque in the load balancing actuator. So that the load balancing actuator can recover the energy loss, caused by throttling on the pressure compensator, and potential energy, generated in a process that the hybrid actuator drives the load to move, into the battery.

In the step S100, when it is determined that the hybrid actuator does not act according to the action signal, the control device adjusts the rotational speed of the power source, or the load sensing pump adjusts its displacement by itself, to cause the power source to drive the load sensing pump to provide a corresponding amount of oil, so that the system pressure outputted by the load sensing pump is equal to the maximum load pressure of the hybrid actuator and the first hydraulic actuator, and each first pressure compensator or second pressure compensator is used to adjust the pressure supplied to the corresponding first hydraulic actuator or second hydraulic actuator.

It can be seen from the above embodiments that, according to the present invention, the second hydraulic actuator and the load balancing actuator in the hybrid actuator jointly bear the external load borne by the hybrid actuator, such that the external load borne by the hybrid actuator is equal to the sum of the forces or torques outputted by the second hydraulic actuator and the load balancing actuator, and by adjusting the force or torque outputted by the load balancing actuator, the output pressure required for the second hydraulic actuator to bear the corresponding part of the load can be changed, so that the load pressure of the second hydraulic actuator can match the load pressures of the first hydraulic actuators on other branches. It can be seen that the load balancing actuator can compensate for the load difference of each hydraulic actuator, making the load pressure on each branch similar, which can reduce the output power of the load sensing pump and decrease the throttling loss of the pressure compensator on the branch. The present invention takes advantage of the characteristic that the motor of the load balancing actuator can operate in the generator mode, enabling the recovery of the potential energy in the system and the energy that would otherwise be consumed on the pressure compensator due to the load difference, thus improving the energy efficiency of the system.

After considering the specification and practicing the present disclosure, a person skilled in the art may easily conceive of other implementations of the present invention. The present application is intended to cover any modification, use or adaptation of the present invention that follows the general principles of the present invention and includes common knowledge or conventional technical means in the art not disclosed by the present invention. The description and examples are to be regarded as exemplary only, and the true scope and spirit of the present invention is indicated by the following claims.

It is to be understood that the present invention is not limited to the precise structure that has been described above and illustrated in the accompanying drawings, and that various modifications and changes can be made without departing from its scope. The scope of the present invention is governed only by the appended claims.

What is claimed is:

1. A hybrid electro-hydraulic load sensing system, comprising a battery, a first inverter, a second inverter, a power source, a load sensing pump, a hybrid actuator, and a first hydraulic actuator, wherein the hybrid actuator comprises a second hydraulic actuator and a load balancing actuator which are connected in parallel, the battery is connected to the power source through the first inverter and connected to the load balancing actuator through the second inverter, the power source is connected to the load sensing pump, the load sensing pump is connected to the first hydraulic actuator through a first control valve and connected to the second hydraulic actuator through a second control valve, and a first pressure sensor and a second pressure sensor are disposed at an inlet and an outlet of the second hydraulic actuator respectively; and a control device is respectively connected to the first pressure sensor, the second pressure sensor, a third pressure sensor, a motor of the load balancing actuator, and one oil control assembly in the power source and the load sensing pump; wherein the control device firstly initiates operation by analyzing pressure data from the first and second pressure sensors alongside incoming action signals to determine the hybrid actuator's operational mode, wherein by using the operational mode and sensor inputs, it calculates a second hydraulic actuator's load pressure ($p_1$), and the system monitors a first hydraulic actuator's maximum load pressure ($p_2$) through the third pressure sensor, wherein based on these pressure values ($p_1$ and $p_2$) and the action signals, the device coordinates two parallel control actions: it regulates the oil control assembly to adjust the load sensing pump's output flow, while controlling the motor to manage both magnitude and direction of the force/torque in the load balancing actuator, so that the load balancing actuator recovers a throttling loss, caused by a load difference between the actuators, and potential energy, generated in a process that the hybrid actuator drives the load to move, into the battery.

2. The hybrid electro-hydraulic load sensing system according to claim 1, wherein the hybrid actuator is a hybrid cylinder composed of a hydraulic cylinder and an electro-mechanical actuator which are connected in parallel, or a hybrid cylinder composed of a hydraulic cylinder and an electro-hydrostatic actuator which are connected in parallel, or a hybrid motor composed of a hydraulic motor and an electric motor which are connected in parallel; and the load balancing actuator is an electro-mechanical actuator, an electro-hydrostatic actuator or an electric motor.

3. The hybrid electro-hydraulic load sensing system according to claim 1, wherein the power source is an electric machine or an engine, and the first hydraulic actuator is a hydraulic cylinder or a hydraulic motor.

4. The hybrid electro-hydraulic load sensing system according to claim 1, wherein an outlet of the load sensing pump is connected to a first inlet of the corresponding first control valve, an outlet of the first control valve is connected to an inlet of the first hydraulic actuator, and an outlet of the first hydraulic actuator is connected to a second inlet of the first control valve; and the outlet of the load sensing pump is also connected to an inlet of the second control valve, an outlet of the second control valve is connected to an inlet of the corresponding second hydraulic actuator, and an outlet of the second hydraulic actuator is connected to a second inlet of the second control valve.

5. The hybrid electro-hydraulic load sensing system according to claim 1, wherein when a plurality of the first hydraulic actuators exist, for every two sequentially adjacent first hydraulic actuators, a first shuttle valve is disposed between the two adjacent first hydraulic actuators, a first inlet of the first shuttle valve is connected to a load feedback port of the first control valve corresponding to one of the two adjacent first hydraulic actuators, a second inlet of the first shuttle valve is connected to an outlet of a next first shuttle valve, an outlet of the first shuttle valve is connected to a second inlet of a previous first shuttle valve, wherein only the outlet of a first one of first shuttle valves is connected to the third pressure sensor, and only the second inlet of the last one of the first shuttle valves is connected to the load feedback port of the first control valve corresponding to the other of the two adjacent first hydraulic actuator, and the maximum load pressure $p_2$ is a maximum load pressure of the plurality of first hydraulic actuators.

6. The hybrid electro-hydraulic load sensing system according to claim 5, wherein when the plurality of the first hydraulic actuators exist, a second pressure compensator is also disposed between the second control valve and the load sensing pump, and the load feedback port of the second control valve is connected to the pilot port of the second pressure compensator; for each first hydraulic actuator, a corresponding first pressure compensator is also disposed between the first control valve corresponding to the first hydraulic actuator and the load sensing pump, and the load feedback port of each first control valve is connected to the pilot port of the corresponding first pressure compensator;

the hybrid electro-hydraulic load sensing system further comprises a second shuttle valve, wherein a first inlet of the second shuttle valve is connected to the load feedback port of the second control valve, and a second inlet of the second shuttle valve is connected to the outlet of the first one of the first shuttle valves; an outlet of the second shuttle valve is connected to the load sensing pump or the fourth pressure sensor, and the outlet of the second shuttle valve screens out the maximum load pressure of the hybrid actuator and the plurality of first hydraulic actuators; when the load difference exceeds a maximum balancing power of the load balancing actuator, resulting in an abnormal operating state of the system, the control device adjusts a rotational speed of the power source according to a pressure detected by the fourth pressure sensor, or the load sensing pump adjusts its displacement by itself, to cause the power source to drive the load sensing pump to supply a corresponding amount of oil, so that a system pressure outputted by the load sensing pump matches the maximum load pressure of the hybrid actuator and the plurality of first hydraulic actuators, and each first pressure compensator or second pressure compensator is used to adjust the pressure supplied to the corresponding first hydraulic actuator or second hydraulic actuator.

7. The hybrid electro-hydraulic load sensing system according to claim 1, wherein when only a single said first hydraulic actuator exists, the third pressure sensor is disposed at a load feedback port of the first control valve, and the maximum load pressure $p_2$ is the load pressure of the first hydraulic actuator.

8. The hybrid electro-hydraulic load sensing system according to claim 7, wherein when only the single said first hydraulic actuator exists, a second pressure compensator is also disposed between the second control valve and the load sensing pump, a load feedback port of the second control valve is connected to a pilot port of the second pressure compensator, a first pressure compensator is also disposed between the first control valve and the load sensing pump, and the load feedback port of the first control valve is connected to a pilot port of the first pressure compensator;

the hybrid electro-hydraulic load sensing system further comprises a second shuttle valve, wherein a first inlet of the second shuttle valve is connected to the load feedback port of the second control valve, a second inlet of the second shuttle valve is connected to the load feedback port of the first control valve, an outlet of the second shuttle valve is connected to the load sensing pump or a fourth pressure sensor, and the outlet of the second shuttle valve screens out the maximum load pressure of the hybrid actuator and the first hydraulic actuator; when the load difference exceeds a maximum balancing power of the load balancing actuator, resulting in an abnormal operating state of the system, the control device adjusts a rotational speed of the power source according to a pressure detected by the fourth pressure sensor, or the load sensing pump adjusts its displacement by itself, to, cause the power source to drive the load sensing pump to supply a corresponding amount of oil, so that a system pressure outputted by the load sensing pump matches the maximum load pressure of the hybrid actuator and the first hydraulic actuator, and the first pressure compensator or the second pressure compensator is used to adjust the pressure supplied to the first hydraulic actuator or the second hydraulic actuator.

9. A control method of the hybrid electro-hydraulic load sensing system according to claim 8, wherein the control device performs system control according to the following steps:

step S100: after receiving an action signal, judging whether the system will be in a state of an independent action of the hybrid actuator or a state of a combined action of the hybrid actuator and the first hydraulic actuator according to the action signal, and sending the action signal to the first control valve and the second control valve corresponding to the hybrid actuator and the first hydraulic actuator, so as to switch the first control valve and the second control valve, thereby switching the system to the corresponding action state;

step S200: calculating a force or torque of the second hydraulic actuator based on pressures in two chambers of the second hydraulic actuator in the hybrid actuator detected by the first pressure sensor and the second pressure sensor, determining a direction of the force or torque of a current load on the hybrid actuator according to the calculated force or torque of the second hydraulic actuator and the force or torque currently outputted by the load balancing actuator in the hybrid actuator, determining, according to the action signal, a movement direction that the hybrid actuator is about to enter after the system is switched to the corresponding action state, and judging whether the hybrid actuator is in an resistive mode or an overrunning mode according to the direction of the force or torque of the current load and the movement direction; and step S300: dividing system working conditions based on the action state and the mode, based on the system working conditions and these pressure values ($p_1$ and $p_2$), regulating the oil control assembly to adjust the load sensing pump's output flow, while controlling the motor to manage both magnitude and direction of the force or torque in the load balancing actuator, so that the load balancing actuator recovers a throttling loss, caused by a load difference between the actuators, and potential energy, generated in a process that the hybrid actuator drives the load to move, into the battery.

10. The control method according to claim 9, wherein judging whether the hybrid actuator is in an resistive mode or an overrunning mode according to the direction of the force or torque of the load and the movement direction in the step S200 comprises: when the direction of the force or torque of the load is opposite to the movement direction, the hybrid actuator being in the resistive mode; and when the direction of the force or torque of the load is the same as the movement direction, the hybrid actuator being in the overrunning mode;

before the step S300, the control method further comprises: obtaining the load pressure $p_1$ of the second hydraulic actuator according to the pressures detected by the first pressure sensor and the second pressure sensor and the determined mode, the load pressure $p_1$ is the inlet pressure of the hybrid actuator; when the hybrid actuator is a hybrid cylinder, if the hybrid cylinder is extending, then the load pressure $p_1$ being a pressure detected by the corresponding pressure sensor connected to a rodless chamber in the second hydraulic actuator; and if the hybrid cylinder is retracting, the load pressure $p_1$ being a pressure detected by the corresponding pressure sensor connected to a rod chamber in the second hydraulic actuator.

11. The control method according to claim 9, wherein the step S300 specifically comprises:

when the system working condition is that the hybrid actuator acts alone in the resistive mode, the motor of the load balancing actuator being unable to operate in a generator mode, controlling the motor of the load balancing actuator not to act, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, and at this time the second hydraulic actuator bearing all the loads and driving the load balancing actuator to move along with the second hydraulic actuator;

when the system working condition is that the hybrid actuator acts alone in the overrunning mode, controlling the motor to drive the load balancing actuator to output a force or torque of a corresponding magnitude in a direction opposite to the direction of the load to cause the load balancing actuator to bear all the loads and operates in the generator mode, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, thereby enabling the second hydraulic actuator to move along with the load balancing actuator;

when the system working condition is that the hybrid actuator acts in combination with the first hydraulic actuator in the resistive mode, comparing the load pressure $p_1$ with the maximum load pressure $p_2$ of the first hydraulic actuator detected by the third pressure sensor:

if $p_1>p_2$, then on the premise that the second pressure compensator corresponding to the hybrid actuator does not act, controlling the motor to drive the load balancing actuator to output a force or torque of a corresponding magnitude in a direction the same as the movement direction of the second hydraulic actuator and opposite to the direction of the load, letting a difference between $p_1$ and $p_2$ be a first pressure, and the force or torque outputted by the load balancing actuator is equal to the force or torque outputted by the second hydraulic actuator when the load applies the first pressure to the second hydraulic actuator, adjusting, by the control device, the rotational speed of the power source, or adjusting, by the load sensing pump, its displacement by itself, to cause the power source to drive the load sensing pump to output a corresponding amount of oil, so that a system pressure outputted by the load sensing pump matches the maximum load pressure $p_2$, and at this time the load balancing actuator operates in an energy consumption mode; and if $p_1<p_2$, then on the premise that the second pressure compensator corresponding to the hybrid actuator does not act, controlling the motor to drive the load balancing actuator to output a force or torque of a corresponding magnitude in a direction opposite to the movement direction of the second hydraulic actuator and the same as the direction of the load, letting a difference between $p_1$ and $p_2$ be a second pressure, the force or torque outputted by the load balancing actuator is equal to the force or torque outputted by the second hydraulic actuator when the load applies the second pressure to the second hydraulic actuator, adjusting, by the control device, the rotational speed of the power source, or adjusting, by the load sensing pump, its displacement by itself, to cause the power source to drive the load sensing pump to supply a corresponding amount of oil, so that a system pressure outputted by the load sensing pump matches the maximum load pressure $p_2$, and at this time the load balancing actuator operates in a generator mode; and when the system working condition is that the hybrid actuator acts in combination with the first hydraulic actuator in the overrunning mode, adjusting, by the control device, the rotational speed of the power source, or adjusting, by the load sensing pump, its displacement by itself, to cause the power source to drive the load sensing pump to output a corresponding amount of oil, so that the system pressure outputted by the load sensing pump matches the maximum load pressure $p_2$, and on the premise that the second pressure compensator corresponding to the hybrid actuator does not act, driving, by the motor, the load balancing actuator to output a force or torque of a corresponding magnitude in the direction opposite to the movement direction of the second hydraulic actuator and opposite to the direction of the load, wherein the force or torque outputted by the load balancing actuator is equal to the sum of the external load on the second hydraulic actuator and the force or torque outputted by the second hydraulic actuator when the load applies the third pressure to the second hydraulic actuator, and at this time the load balancing actuator operates in the generator mode.

12. The control method according to claim 9, wherein in the step S100, when it is determined that the hybrid actuator does not act according to the action signal, the control device adjusts the rotational speed of the power source, or the load sensing pump adjusts its displacement by itself, to cause the power source to drive the load sensing pump to provide a corresponding amount of oil, so that the system pressure outputted by the load sensing pump matches the maximum load pressure of the hybrid actuator and the first hydraulic actuator, and each first pressure compensator or second pressure compensator is used to adjust the pressure supplied to the corresponding first hydraulic actuator or second hydraulic actuator.

13. The control method according to claim 10, wherein the step S300 specifically comprises:

when the system working condition is that the hybrid actuator acts alone in the resistive mode, the motor of the load balancing actuator being unable to operate in a generator mode, controlling the motor of the load balancing actuator not to act, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, and at this time the second hydraulic actuator bearing all the loads and driving the load balancing actuator to move along with the second hydraulic actuator;

when the system working condition is that the hybrid actuator acts alone in the overrunning mode, controlling the motor to drive the load balancing actuator to output a force or torque of a corresponding magnitude in a direction opposite to the direction of the load to cause the load balancing actuator to bear all the loads and operates in the generator mode, and on the premise that the second pressure compensator corresponding to the hybrid actuator does not act, adjusting, by the control device, the rotational speed of the power source, or adjusting, by the load sensing pump, its displacement by itself, to cause the power source to drive the load sensing pump to supply a corresponding amount of oil, thereby enabling the second hydraulic actuator to move along with the load balancing actuator;

when the system working condition is that the hybrid actuator acts in combination with the first hydraulic actuator in the resistive mode, comparing the load pressure $p_1$ with the maximum load pressure $p_2$ of the first hydraulic actuator detected by the third pressure sensor:

if $p_1>p_2$, then on the premise that the second pressure compensator corresponding to the hybrid actuator does not act, controlling the motor to drive the load balancing actuator to output a force or torque of a corresponding magnitude in a direction the same as the movement direction of the second hydraulic actuator and opposite to the direction of the load, letting a difference between $p_1$ and $p_2$ be a first pressure, and the force or torque outputted by the load balancing actuator is equal to the force or torque outputted by the second hydraulic actuator when the load applies the first pressure to the second hydraulic actuator, adjusting, by the control device, the rotational speed of the power source, or adjusting, by the load sensing pump, its displacement by itself, to cause the power source to drive the load sensing pump to output a corresponding amount of oil, so that a system pressure outputted by the load sensing pump matches the maximum load pressure $p_2$, and at this time the load balancing actuator operates in an energy consumption mode; and if $p_1<p_2$, then on the premise that the second pressure compensator corresponding to the hybrid actuator does not act, controlling the motor to drive the load balancing actuator to output a force or torque of a corresponding magnitude in a direction opposite to the movement direction of the second hydraulic actuator and the same as the direction of the load, letting a difference between $p_1$ and $p_2$ be a second pressure, the force or torque outputted by the load balancing actuator is equal to the force or torque outputted by the second hydraulic actuator when the load applies the second pressure to the second hydraulic actuator, adjusting, by the control device, the rotational speed of the power source, or adjusting, by the load sensing pump, its displacement by itself, to cause the power source to drive the load sensing pump to supply a corresponding amount of oil, so that a system pressure outputted by the load sensing pump matches the maximum load pressure $p_2$, and at this time the load balancing actuator operates in a generator mode; and when the system working condition is that the hybrid actuator acts in combination with the first hydraulic actuator in the overrunning mode, adjusting, by the control device, the rotational speed of the power source, or adjusting, by the load sensing pump, its displacement by itself, to cause the power source to drive the load sensing pump to output a corresponding amount of oil, so that the system pressure outputted by the load sensing pump matches the maximum load pressure $p_2$, and on the premise that the second pressure compensator corresponding to the hybrid actuator does not act, driving, by the motor, the load balancing actuator to output a force or torque of a corresponding magnitude in the direction opposite to the movement direction of the second hydraulic actuator and opposite to the direction of the load, wherein the force or torque outputted by the load balancing actuator is equal to the sum of the external load on the second hydraulic actuator and the force or torque outputted by the second hydraulic actuator when the load applies the third pressure to the second hydraulic actuator, and at this time the load balancing actuator operates in the generator mode.

* * * * *